US009342332B2

(12) United States Patent
Jubran et al.

(10) Patent No.: US 9,342,332 B2
(45) Date of Patent: *May 17, 2016

(54) CLOUD-BASED BUILD SERVICE

(71) Applicant: Microsoft Corporation, Redmond, WA (US)

(72) Inventors: Marwan E. Jubran, Redmond, WA (US); Vitalii Tsybulnyk, Redmond, WA (US); Aleksandr Gershaft, Redmond, WA (US); Vladimir Petrenko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,447

(22) Filed: Jan. 17, 2014

(65) Prior Publication Data
US 2014/0137116 A1  May 15, 2014

Related U.S. Application Data

(63) Continuation of application No. 13/221,202, filed on Aug. 30, 2011, now Pat. No. 8,635,607.

(51) Int. Cl.
| G06F 9/45 | (2006.01) |
| G06F 9/455 | (2006.01) |
| G06F 9/44 | (2006.01) |
| G06F 9/50 | (2006.01) |

(52) U.S. Cl.
CPC ........ G06F 9/455 (2013.01); G06F 8/70 (2013.01); G06F 8/71 (2013.01); G06F 9/505 (2013.01)

(58) Field of Classification Search
None
See application file for complete search history.

(56) References Cited

U.S. PATENT DOCUMENTS

| 8,489,929 B2* | 7/2013 | Lam et al. ................ 714/38.1 |
| 2007/0234320 A1* | 10/2007 | Gu ............................. 717/140 |
| 2009/0049430 A1* | 2/2009 | Pai et al. .................... 717/140 |
| 2012/0017210 A1* | 1/2012 | Huggins et al. ............... 718/1 |

OTHER PUBLICATIONS

"Supplementary Search Report Issued in European Patent Application No. 12827532.8", Mailed Date: Apr. 1, 2015, 6 Pages.
Schiffman, et al., "Justifying Using a Virtual Machine Verifier", In Computer Security Applications Conference, Dec. 7, 2009, pp. 83-92.

* cited by examiner

Primary Examiner — Philip Wang
(74) Attorney, Agent, or Firm — Ben Tabor; Kate Drakos; Micky Minhas

(57) ABSTRACT

Building binary packages for software products, particularly large-scale software products, is a highly computation intensive process. Thus, it is desirable to distribute the workload over a large number of computing nodes so as to have the build process complete in an optimal period of time. One environment providing compute resources that can be utilized for a highly available and dynamically scalable distributed build process is an elastic compute cloud. In such an environment, virtual machines can be instantiated and destroyed as the resource requirements of the build process dictate. This has the advantage that dedicated hardware is unneeded, and excess capacity on the hardware employed can be employed for other computation tasks when the build process is idle. Presented herein are systems, methods and computer storage media for distributing a highly available and scalable build service, suitable for use in an elastic compute environment or other distributed environment.

20 Claims, 6 Drawing Sheets

CLOUD-BASED BUILD SERVICE

CROSS-REFERENCE TO RELATED APPLICATIONS

This application is a continuation of, and claims priority from, U.S. patent application Ser. No. 13/221,202, filed Aug. 30, 2011, entitled "CLOUD-BASED BUILD SERVICE" which is incorporated herein by reference in its entirety.

BACKGROUND

Building binary packages for software products, particularly large-scale software products, is a highly computationally intensive process; thus, it is desirable to distribute the workload over a large number of computing nodes so as to have the build process complete in a reasonable period of time. However, the demand for such a build service can be highly intermittent, so it is undesirable to have dedicated build resources that would stand idle during periods of low demand. Accordingly, methods and system for leveraging cloud resources in order to distribute a build service in a highly available, dynamically scalable, and efficient fashion are provided herein.

SUMMARY

Embodiments of the present invention relate to systems, methods and computer storage media for distributing a highly available, dynamically scalable, and efficient build service. One environment providing compute resources that can be utilized for a scalable distributed build process is an elastic compute cloud. In such an environment, virtual machines can be instantiated and destroyed as the resource requirements of the build process dictate. One advantage of this approach is that dedicated hardware is unneeded, and excess capacity on the hardware can be employed for other computation tasks when the build process is idle. However, it may be advantageous for certain components to remain unvirtualized. In certain applications, for example, signing keys are tightly controlled on dedicated servers rather than being permitted to be stored on shared hardware. Thus, the architecture disclosed herein provides for a system which is efficient, scalable, highly available, and secure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, and wherein.

DETAILED DESCRIPTION

Figure 1:
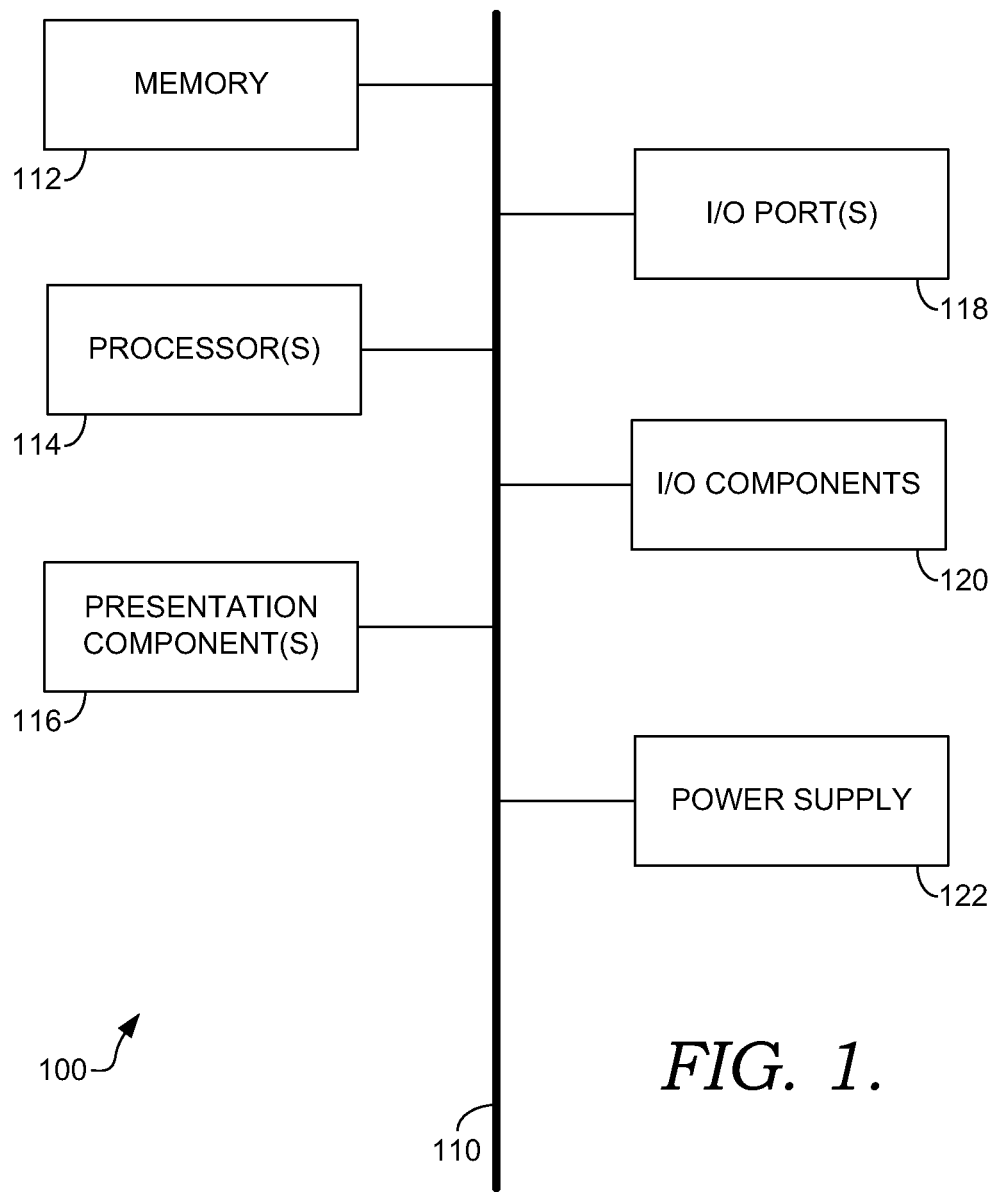
FIG. 1 depicts an exemplary computing device suitable for implementing embodiments of the present invention.

The subject matter of the present invention is described with specificity to meet statutory requirements. However, the description itself is not intended to define the scope of the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention relate to methods and architecture for a highly available, scalable, distributed service. Accordingly, in one aspect, the present invention comprises one or more computer storage media having computer-executable instructions embodied thereon that, when executed, cause a computing device to perform a method of distributing a highly available, scalable build service, the method comprising determining a branch to build, identifying a virtual machine for building at least a part of the branch, and identifying a plurality of source files to be transferred for the branch, wherein the virtual machine processes at least a source file of the plurality of source files to generate a corresponding binary file. The method further comprises transferring the source file of the plurality of source files to the virtual machine, deploying a build environment on the virtual machine, and causing the virtual machine to process at least the source file of the plurality of source files so as to generate a binary file. The method additionally comprises causing a digital signature for the binary file to be generated, transferring the digital signature to a second virtual machine, and causing at least the second virtual machine to generate a binary package from at least the binary file and the digital signature.

In another aspect, the invention comprises a highly available, scalable, distributed build service system comprising a plurality of virtual machines, each of which receives a source file, processes at least the source file so as to generate a binary file, receives a digital signature corresponding to the binary file, and generates a binary package from at least the binary file and the digital signature. The build system also comprises a first source repository that stores the source file, and sends the source file to a build service controller. The build system further comprises a signing server that receives a representation of the binary file sufficient to generate a digital signature for the binary file, and generates the digital signature corresponding to the representation of the binary file. The build system also comprises the build service controller, which is functionally connected to the plurality of virtual machines, the first source repository, and the signing server, and which determines a branch to build, identifies a plurality of source files to be transferred for the branch, retrieves said plurality of source files from at least the first source repository, sends a first source file of the plurality of source files to a first virtual machine of the plurality of virtual machines, receives the representation of the binary file sufficient to generate the digital signature for the binary file and forwards the representation to the signing server, and receives the digital signature and forwards the digital signature to a second virtual machine of the plurality of virtual machines.

In yet another aspect, the invention comprises a computer-implemented method suitable for use in a distributed computing environment utilizing a processor and a memory for implementing a highly available, scalable, distributed build service, the method comprising receiving, at a single physical machine, a plurality of source files corresponding to a plurality of binary files to be generated and instantiating a plurality of virtual machines on a single physical machine, each virtual machine of the plurality of virtual machines configured with a build environment. The plurality of virtual machines is a number of virtual machines equal to a number of binary files to be generated at the single physical machine. The method further comprises sending to each virtual machine of the plurality of virtual machines those source files corresponding to a respective single binary file of the plurality of binary files, causing each virtual machine of the plurality of virtual machines to generate the respective binary file from the source files, causing a digital signature to be generated for at least a binary file of a plurality of generated binary files, and causing a binary package to be generated. The binary package comprises a binary file and a corresponding digital signature.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment including device 100 be interpreted as having any dependency or requirement relating to any one or combination of modules/components illustrated.

Embodiments may be described in the general context of computer code or machine-usable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise the following exemplary non-transitory media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
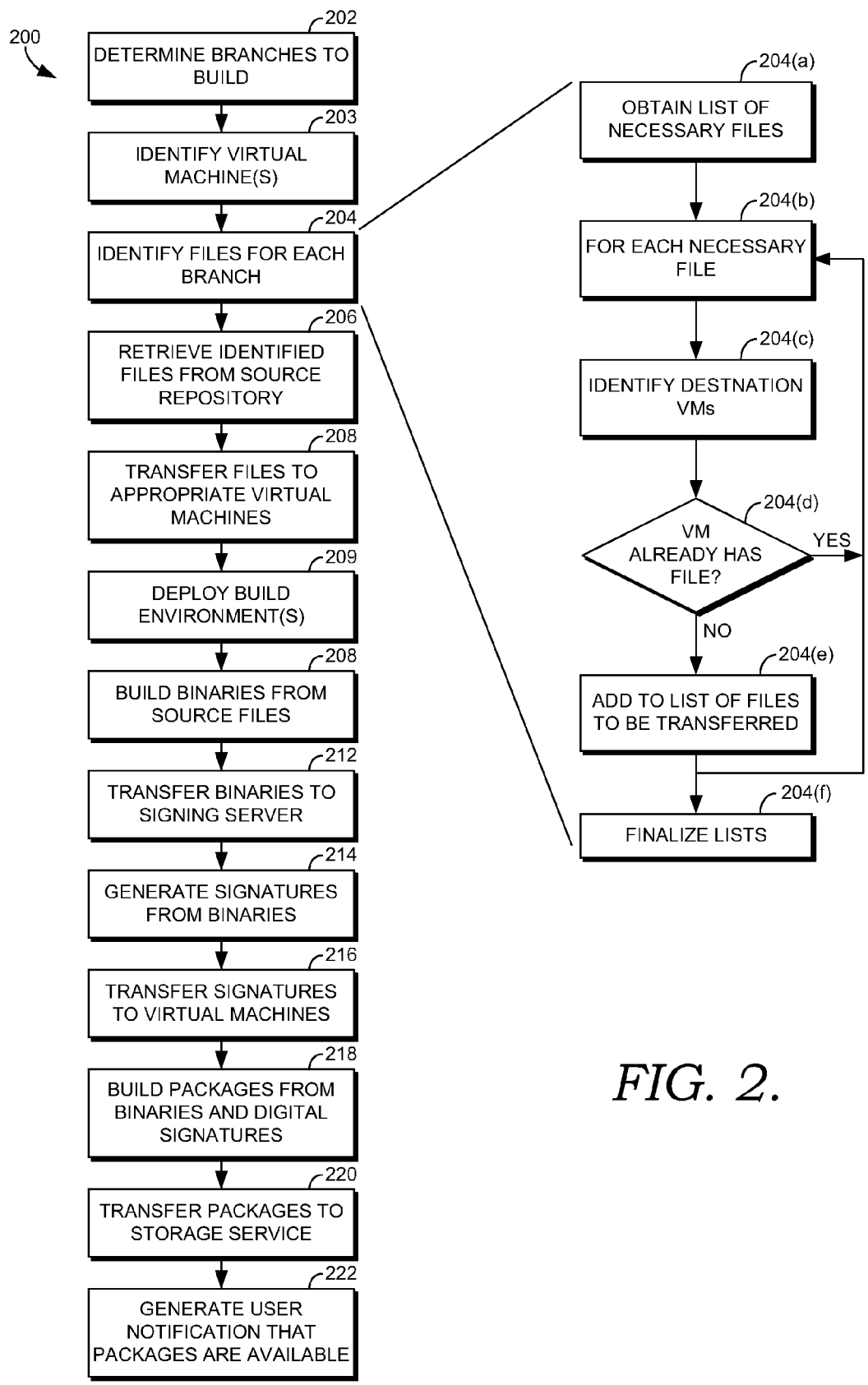
FIG. 2 depicts a flowchart diagram in accordance with one aspect of the present invention.

Turning now to FIG. 2, a flowchart diagram in accordance with one aspect of the present invention is presented, and referred to generally by reference numeral 200. In certain embodiments, this method is suitable for execution by a build system controller. Initially, at a step 202, a list of one or more branches to build is determined. As is understood in the art, a "branch" is a pre-defined configuration of build settings and source code files (or portions of source code files) to create a particular version of a software product from a common code repository. For example, a code base could have "Development" and "Release" branches. As another example, a code base could have different branches for different operating systems or hardware platforms. In yet another example, a code base could have branches for different feature sets, such as "Basic," "Home," "Professional," and "Enterprise" versions. Commonly, different branches will share substantial portions of source code, and differ only in certain respects. In one embodiment, the determination of which branches to build is made based on user input. In another embodiment, a configuration file is consulted to determine which branches to build. In yet another embodiment, the current build environment is used to determine which branches to build.

Next, at a step 203, the virtual machines for the build are identified. In one embodiment, the build service initially has a pool of virtual machines instantiated on one or more virtual machine servers and standing idle; virtual machines are first selected from this pool and, if additional capacity is needed, additional virtual machines are instantiated as needed. In a variation of this embodiment, the size of the pool of pre-instantiated virtual machines is increased or decreased according to historical demand. In another embodiment, virtual machines are simply instantiated on demand.

After the virtual machines for the build are identified, a list of files that should be transferred to the worker virtual machines in order to build those branches is determined at a step 204. In one embodiment, step 204 is accomplished as shown by substeps 204(a)-204(f). At a step 204(a), a list of all files used to build all of the selected branches is compiled. In certain embodiments, this information is obtained from build configuration files. Next, at a step 204(b), the succeeding steps 204(c)-204(e) are repeated for each file so identified. At step 204(c), one or more virtual machines (VMs) which will require that file to build the branches are identified. At step 204(d), it is determined whether each VM so identified already has a copy of the file. A VM may already have a copy of the file, for example, from building another branch that used the file, or from building a previous version of the current branch if the file remains unchanged in the current branch. In certain embodiments, files are preemptively loaded onto VMs which might use them later to utilize otherwise unused transfer bandwidth and/or storage space. If it is determined that the VM does not already have the file, the file is added to a list of files to be transferred to that VM at a step 204(e). Otherwise, processing returns to step 204(b) to consider the next file. Once each file has been processed by steps 204(c)-204(e), the lists of files to be transferred to each VM are finalized at a step 204(f).

Once the files to be transferred are identified at step 204, they are retrieved from one or more source repositories at a step 206. As described above, in some embodiments, certain of the files may already be present in local storage for one of a variety of reasons, and these files need not be retrieved. Next, at a step 208, the files previously identified are transferred to the appropriate virtual machines. Note that certain files may be used by multiple virtual machines and accordingly are transferred to each of those machines. In one embodiment, virtual machines are grouped onto virtual machine servers according to the degree of commonality of files which they will require in order to minimize the network overhead of file transfers. In another embodiment, virtual machines are assigned to virtual machine servers according to a degree of commonality between the files they will require and the files previously cached at the virtual machine server.

Next, at a step 209, build environments are distributed to virtual machines as needed. In certain embodiments, build environments are instead distributed to virtual machines before source files are transferred to virtual machines. One role of the build environment is to drive the build process. In some embodiments, the build environment contains an agent that responds to the build service controller, provides status of activities, and executes commands. In other embodiments, the build environment responds directly to user input in order to perform activities. The build environment can further comprise tools and build components such as compilers, assemblers, linkers and other tools, as well as the workflow used to process source files in order to generate binary files.

At this point, the virtual machines can begin the build process by processing the source files to generate binary files. In one embodiment of the invention, each virtual machine is responsible for generating all of the binary files associated with a given branch. In another embodiment, each virtual machine is responsible for generating a single binary (i.e. the number of virtual machines is the same as the number of binaries). In yet another embodiment, the set of all binary files to be generated is allocated over the available virtual machines in such a way so as to equalize the processing performed by each virtual machine. In still another embodiment, a plurality of binary files corresponding to different branches for more than one branch is allocated to a single virtual machine. Other ways of allocating the binaries to be built among the available virtual machines are also contemplated. The allocation of binaries to virtual machines will inform the identification and transfer of files at steps 204 and 208 respectively. At a step 210, the virtual machines process the appropriate source files in order to generate the binary files. In some embodiments, another component, such as a build service controller 302 of FIG. 3, causes the virtual machines to begin this processing. Here "processing" the file can include steps of pre-processing, compilation, assembly, and linking, among others, and "binary files" can include native executable files, intermediate representation files, bytecode representation files, object files and library files, among others. Similarly, "causing" can encompass a variety of techniques including direct code execution, inter-process communication, client-server or peer-to-peer messaging, remote command execution, web services, or remote script invocation. Other techniques for causing the virtual machines to process the files, as would be apparent to one skilled in the art, are also envisioned.

According to user input, build configuration files, or other general policies, certain of the generated binary files may be digitally signed in order to authenticate their origins, untampered state, or for other reasons. Digital signature algorithms employed can include algorithms such as RSA, DSA, Elliptic Curve DSA, ElGamal or other secure digital signature algorithms. In many environments, the digital keys necessary for the signing process are stored only at a small number of locations for security purposes, and are therefore not distributed to the virtual machines. Accordingly, in some embodiments, after the binaries have been generated, they are transferred to a dedicated signing server for signing at a step 212. Next, at a step 214, the corresponding digital signatures are generated. In some embodiments, another component such as build service controller 302, to be discussed with respect to FIG. 3, causes this to happen by any of a variety of methods, as described above. In a variation of this embodiment, rather than the binaries being transferred, the appropriate virtual machine generates a representation of the binary sufficient for the signature to be generated. For example, many digital signature algorithms actually sign a secure hash of the file rather than the entire file; since the signing keys are not necessary to generate this hash in this example, the virtual machine can generate the hash itself and send only that to the signing server. This scheme has the dual advantages of decreasing the workload of the signing server as well as the network load associated with transmitting the binary file: instead of transmitting a (potentially very large) binary file, only the (typically less than 1 kB) hash is sent. Here and throughout "send" includes both sending directly and sending indirectly by causing something to be sent. At a step 216 the generated signatures are transferred back to the virtual machines. In some embodiments, binaries modified by the addition of a digital signature are transferred back to the virtual machines instead of a detached signature. The term "signature" herein includes both a detached signature and a binary modified in this fashion.

Once the binary files and signatures have been collected, they are assembled into binary packages at a step 218. In some embodiments, another component such as the build service controller 302 of FIG. 3 causes this to happen by any of a variety of methods, as described above. In some embodiments, these binary packages also contain data files not affected by the build process. In some embodiments, the assembly of a binary package begins as soon as those binary files and digital signatures for that package have been collected; in other embodiments, the package generation process does not begin until the build and signature generation processes have completely finished. Once the packages have been generated, they are transferred off of the virtual machines. In one embodiment, this is done by publishing them to a storage service at a step 220. In another embodiment, one or more of the virtual machines acts as a repository and serves the virtual machines directly. Finally, in some embodiments, a user notification is generated at a step 222. This user notification can take a variety of forms such as an email, an instant message, a phone call, a pop-up alert in an application, or other alert.

Figure 3:
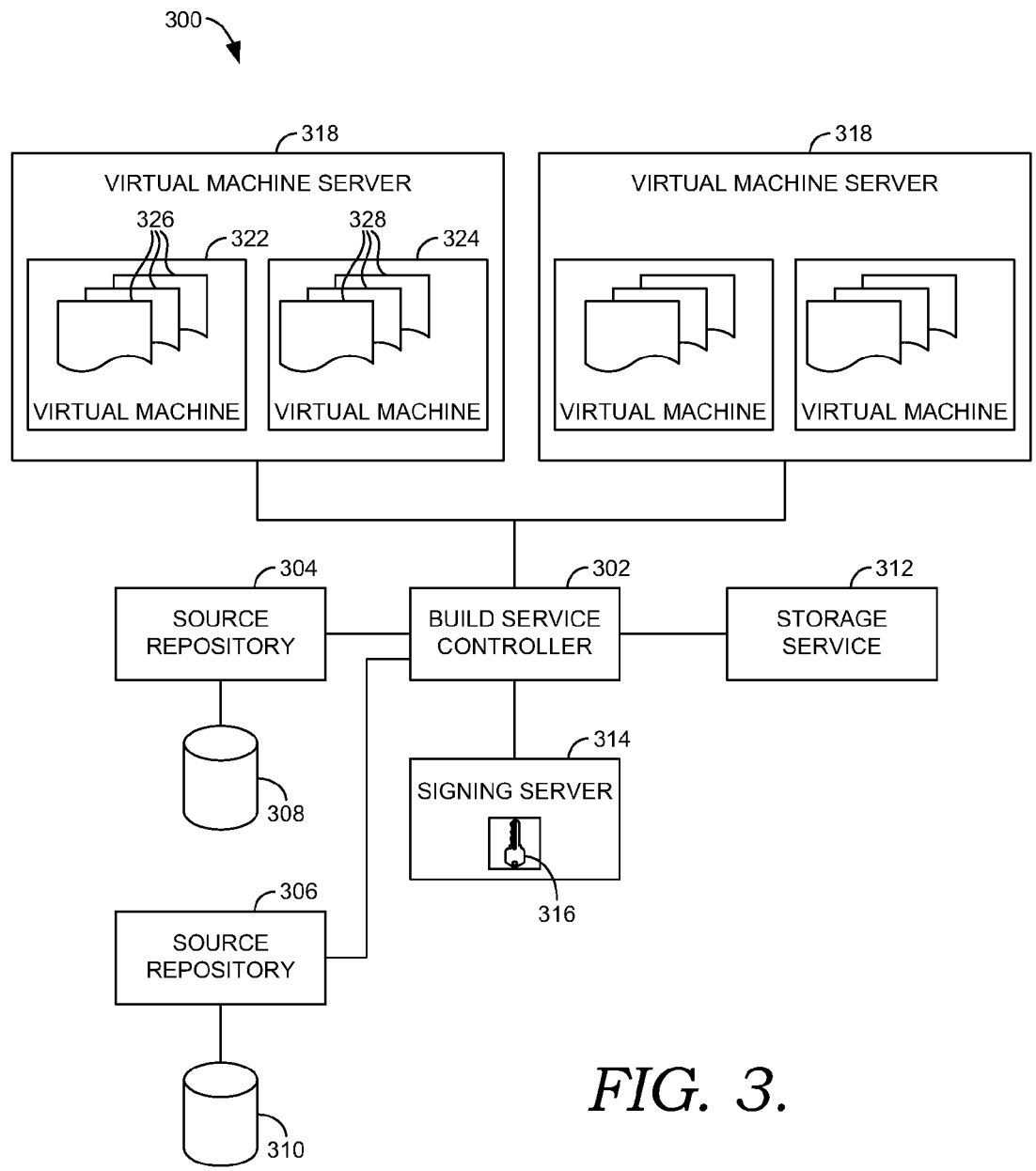
FIG. 3 depicts an environment suitable for implementing embodiments of the present invention.

Turning now to FIG. 3, an environment suitable for implementing embodiments of the present invention is presented and referred to generally by reference numeral 300. A build service controller 302 serves, in some embodiments, as the central controller for the system, and is functionally connected to the other components. In some embodiments, the connections are via LAN, WAN or Internet connections. These connections may be direct or indirect. In other embodiments, the components of system 300 are conceptual and several components may be combined into a single physical server; in those cases, the connections are in the form of shared storage and/or inter-process communication. In some embodiments, the build service controller maintains metadata to track mappings of worker VMs to code branches. In some embodiments, the build service provides a frontend to receive user input, display job status and provide access to build metrics. In some embodiments, the build controller may be responsible for scheduling the build process for future execution. This can take the form of deferring the build until system load is lower, or scheduling the build for a period when expected demand is low. Other scheduling heuristics are also contemplated. In some embodiments, the build controller is responsible for dynamic virtual machine scheduling. This can take the form of increasing or decreasing the number of virtual machines dedicated to the build process. This can also take the form of migrating virtual machines from a busy virtual machine server to another, less busy, virtual machine server. This can further take the form of manipulating the scheduling of virtual machines within a single virtual machine to, for example, allocate more resources to a virtual machine with a heavy workload than to a virtual machine with a light workload. Other forms of dynamic virtual machine scheduling are also contemplated. Connected to the build service controller are one or more source repositories such as a source repository 304 and a source repository 306. Each such source repository has associated storage, respectively storage 308 and storage 310. The storage associated with a source repository may be local storage, network-attached storage, cloud-based storage, or other storage accessible by the source repository. In some embodiments, only a single source repository may be present; in others, many source repositories are present.

Similarly connected to build service controller 302 is a storage service 312, which makes binary packages (and in some embodiments, other files as well) available to users. In some embodiments, storage service 312 is a durable and highly available storage service, such as a geo-replicated cloud-based storage service. In some embodiments, the functionality of storage service 312 and a source repository such as source repository 304 is combined into a single physical server. In other embodiments, the storage service 312 and the source repository 304 are separate physical servers but share common back-end storage such as storage 308. In some embodiments, storage service 312 stores the build environments which are deployed on created virtual machines. In other embodiments, build environments are stored on a source repository such as source repository 304. In yet other embodiments, build environments are stored on build service controller 302, from which they are deployed. Any combinations of storage solutions are also contemplated. Also connected to build service controller 302 is a signing server 314. Signing server 314 performs the service of generating digital signatures for generated binary files, as discussed above with reference to steps 212, 214, and 216 of FIG. 2. Signing server 314 stores signing keys 316, which are used to generate digital signatures.

Finally, build service controller 302 is connected to one or more virtual machine servers such as virtual machine servers 318 and 320. Each virtual machine server represents a physical computer which potentially runs a plurality of virtual machines such as virtual machine 322 and 324. In some embodiments, some or all of the virtual machines may be dedicated to other tasks unrelated to the build service at any given time. In some embodiments, virtual machine servers 318 and 320 are a part of a private or public compute cloud. In some embodiments, virtual machines are instantiated as needed and destroyed or garbage collected when they become unneeded or unused. In some embodiments, build service controller 302 scales the number of worker VMs used according to the needs of the build service. Each virtual machine such as virtual machine 322 is loaded with some set of source and data files 326 which are used to produce binary packages, as informed by the build environment loaded onto the virtual machine. Note that the files 328 stored by virtual machine 324 may have complete, partial, or no overlap with the files 326 stored by virtual machine 322, or with the files stored by the virtual machines on virtual machine server 320. Any of the components of the build system depicted in FIG. 3 may utilize one or more processors and/or memory to carry out the functions described herein.

Figure 4:
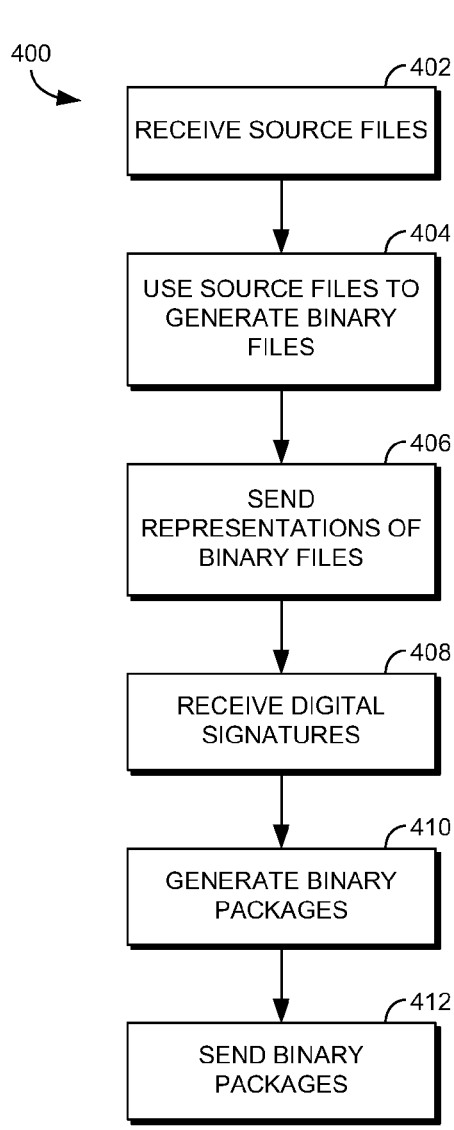
FIG. 4 depicts a flowchart diagram for a method of processing source files to produce binary packages in accordance with another aspect of the present invention, suitable for execution by a virtual machine.

Turning now to FIG. 4, a flowchart diagram in accordance with another aspect of the present invention is presented. FIG. 4 depicts a method suitable for execution by a virtual machine such as virtual machine 322 and is referred to generally by the reference numeral 400. Initially, at a step 402, zero or more source files are received. The files received, in combination with zero or more files already stored locally, are sufficient to produce one or more binary files. Collectively, these files may correspond to files 326 of FIG. 3. Next, at a step 404, these files are processed to generate one or more binary files. At a step 406, representations of the generated binary files are sent to a signing server. In some embodiments, these representations are sent directly to the signing server; in other embodiments, they are sent to the build service controller or other intermediate host, which forwards them to the signing server. In some embodiments, the "representations" comprise the entire binary file to be signed; in other embodiments, the representations comprise a smaller amount of information sufficient for signature generation, such as a collision-resistant cryptographic hash of the binary to be signed. In still other embodiments, such as the case of a private or testing build, the step of signing the binary can be omitted.

Next, at a step 408, digital signatures corresponding to the binary files to be signed are received. Again, these digital signatures may be received directly from the signing server or indirectly via the build service controller or another intermediate host. These digital signatures, together with one or more corresponding or unsigned binary files are used to generate binary packages at a step 410. Finally, at a step 412 the binary packages are transmitted to another host. In some embodiments, they may be transmitted to a storage service such as storage service 312 to be published. In other embodiments, the binary packages may be sent to the build service controller 302. In yet another embodiment, they are sent to the computer of the user who initiated the build process.

Figure 5:
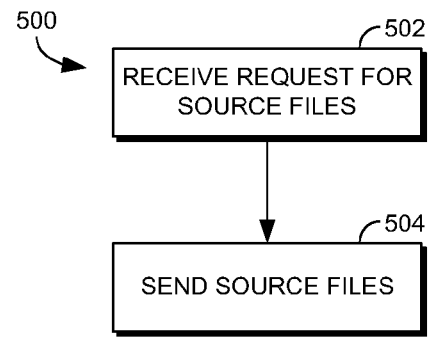
FIG. 5 depicts a flowchart diagram for a method of providing source files on demand, in accordance with another aspect of the present invention, suitable for execution by a source repository.

FIG. 5 depicts a method suitable for execution by a source repository such as source repository 304 in accordance with embodiments of the present invention and referred to generally by reference numeral 500. Initially at a step 502, a request is received for one or more source files. In one embodiment, this request is received from build service controller 302 of FIG. 3. In another embodiment, the request is received from a virtual machine such as virtual machine 322 running on virtual machine server 318, both of FIG. 3. Next, at a step 504, the requested files are retrieved from storage and transmitted. In one embodiment, they are transmitted to the requestor; in another embodiment, they are transmitted to another host such as build service controller 302 or virtual machine server 318 for caching and forwarding to the requestor.

Figure 6:
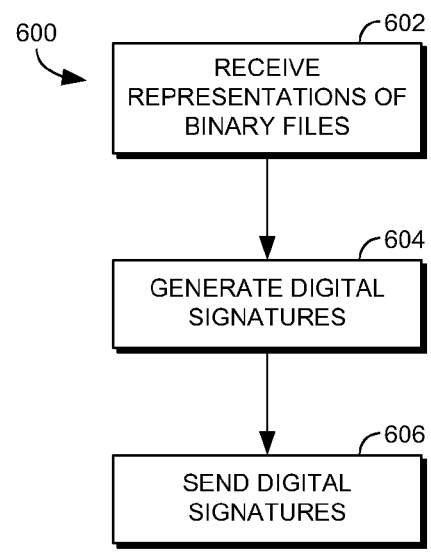
FIG. 6 depicts a flowchart diagram for a method of generating digital signatures for binary files in accordance with another aspect of the present invention, suitable for execution by a signing server.

FIG. 6 depicts a method suitable for execution by a signing server such as signing server 314 in accordance with embodiments of the present invention and referred to generally by reference numeral 600. Initially, at a step 602, one or more representations of binary files are received. In one embodiment, the request is received directly from a virtual machine such as virtual machine 322 of FIG. 3. In another embodiment, the request is received via the build service controller or other intermediate host. As discussed above, in some embodiments, the representation is the entire binary file to be signed, while in other embodiments the representation is a smaller amount of information sufficient for signature generation. In some embodiments, the signing server performs additional steps such as virus scanning, verification of correct form, and confirmation of build location before generating a signature. Next, at a step 604, one or more digital signatures corresponding to the one or more representations are generated. This can be accomplished by any of a number of well-known digital signature algorithms, and employs digital signature keys 316 of FIG. 3. Finally, at a step 606, the one or more generated signatures are sent back to the requestor.

Figure 7:
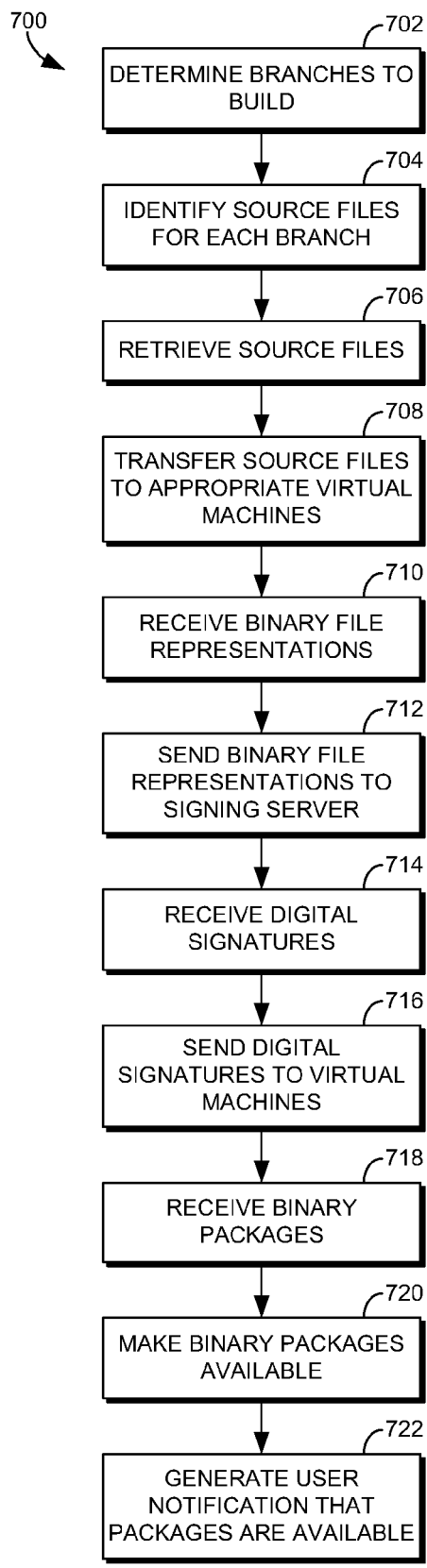
FIG. 7 depicts a flowchart diagram for a method of controlling a build service in accordance with another aspect of the present invention, suitable for execution by a build service controller.

FIG. 7 depicts a method suitable for execution by a build source controller such as build source controller 302 of FIG. 3 in accordance with embodiments of the present invention and referred to generally by reference numeral 700. Initially, at a step 702, a list of one or more branches to build is determined. In one embodiment, the determination of which branches to build is made based on user input. In another embodiment, a configuration file is consulted to determine which branches to build. In yet another embodiment, the current build environment is used to determine which branches to build. Next, at a step 704, a list of files that should be transferred to the worker virtual machines in order to build those branches is determined. In one embodiment, this can be accomplished as described in steps 204(*a*)-204(*f*) and the accompanying discussion of FIG. 2. Once the files have been identified, they are retrieved from one or more source repositories such as source repository 304 and source repository 306 of FIG. 3 at a step 706 and transferred to the appropriate virtual machines at a step 708. Again, certain files may be used by multiple virtual machines and accordingly are transferred to each of those machines. In one embodiment, virtual machines are grouped onto virtual machine servers according to the degree of commonality of files that they will use in order to minimize the network overhead of file transfers. In another embodiment, copies of files transferred are maintained so that they need not be re-fetched from a source repository if they are needed again in the future.

Next, at a step 710, representations of binary files to be signed are received at the computer executing method 700; in certain embodiments, this will be build service controller 302 of FIG. 3. In one embodiment, they are received from the virtual machines which generated the binary files. In one embodiment, the entire binary file is received and a more compact representation is generated for subsequent retransmission. Then, at a step 712, the representations are forwarded (e.g. sent) to a signing server such as signing server 314. Subsequently, at a step 714, digital signatures corresponding to the representations are received back from the signing server and, at a step 716, they are forwarded to the appropriate virtual machines. In some embodiments, the appropriate virtual machine is the virtual machine that created the corresponding binary files; in others, it is another virtual machine that is responsible for binary package creation. At a step 718, binary packages comprising binary files corresponding to the source files and digital signatures are received. In one embodiment, they are received from the virtual machines that created them. In another embodiment, they further comprise data files that were unchanged by the build process. Next, at a step 720, these packages are made available for subsequent retrieval. In one embodiment, this is accomplished by publishing them to a storage service. In another embodiment, it is accomplished by transferring them to a predetermined location. In yet another embodiment, it is accomplished by storing them locally until they are retrieved by a user. Finally, at a step 722, a notification is generated to alert a user that the packages are available. This notification can take any of the forms discussed with reference to step 222 of FIG. 2.

Figure 8:
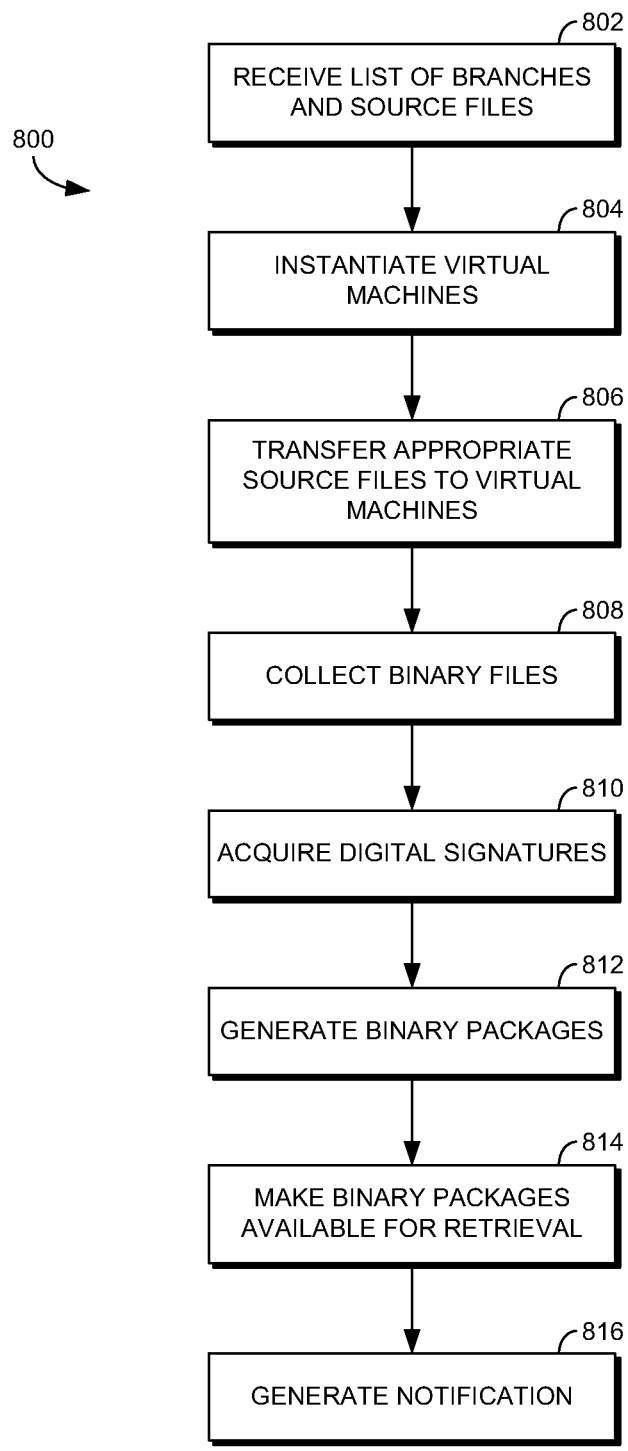
FIG. 8 depicts a flowchart diagram for operating a virtual machine server in order to produce binary packages from source files in accordance with yet another aspect of the present invention.

Turning now to FIG. 8, a flowchart diagram in accordance with yet another aspect of the present invention is depicted, suitable for execution by a virtual machine server such as virtual machine server 318 of FIG. 3 and referred to generally by reference numeral 800. In some embodiments, the virtual machine server 318 of FIG. 3 is a single physical machine such as a laptop, desktop, or server-class computer. In other embodiments, virtual machine server 318 can itself be a distributed computing environment such as a server farm.

Initially, at a step 802, a list of one or more branches and source files is received. In one embodiment, only a list of source files is received and the source files are retrieved from a source repository such as source repository 304. In another embodiment, the source files are received together with the list of one or more branches. Next, at a step 804, one or more virtual machines are instantiated. As discussed above in the discussion of allocating binaries to virtual machines, a number of allocation strategies are envisioned, and the precise allocation strategy used will inform the number of virtual machines instantiated. The step 804 further includes preparing the virtual machines to participate in the build service. The preparation includes deployment of the build environment. The build environment can be loaded onto the worker VM during instantiation, or pushed to the worker VMs by build system controller 302 after instantiation. After the virtual machines have been instantiated, the appropriate source files are transferred to each virtual machine at a step 806.

Next, at a step 808, the binary files generated from those source files are collected from the virtual machines. In one embodiment, compact representations of the binary files are generated for the purposes of signing them. Next, at a step 810, digital signatures for the binaries are acquired. In one embodiment, this is accomplished by communicating directly with signing server 314 of FIG. 3; in another embodiment, it is accomplished by communicating with signing server 314 via build service controller 302 of FIG. 3. At a step 812, binary packages are generated from the binary files, the digital signatures, and in some embodiments, other data files. Next, at a step 814, the binary packages are made available for retrieval. In one embodiment, this comprises transmitting them to the location from which they will be retrieved. In another embodiment, it comprises placing them in a well-known local location on the VM from which a software agent or human can retrieve them. Finally, at a step 816, a notification is generated. In one embodiment, this is a user notification; in another embodiment it consists of notifying a software agent.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description.

The invention claimed is:

1. A computer-implemented method, suitable for use in a distributed computing environment, utilizing a processor and a memory for implementing a scalable and distributed build service, the method comprising:
   determining a branch to build;
   identifying a virtual machine for building at least a part of the branch;
   identifying a plurality of source files to be transferred for the branch, wherein the virtual machine processes at least a source file of the plurality of source files to generate a corresponding binary file;
   transferring the source file of the plurality of source files to the virtual machine;
   deploying a build environment on the virtual machine on demand, based on requiring resources of the virtual machine;
   causing, using one or more processors, the virtual machine to process at least the source file of the plurality of source files so as to generate a binary file; and
   causing a signing server to generate a digital signature for the binary file based on a representation of the binary file, the signing server being different from the virtual machine.

2. The computer-implemented method of claim 1, further comprising:
   transferring the digital signature to the virtual machine;
   causing at least the virtual machine to generate a binary package from at least the binary file and the digital signature; and
   retrieving the binary package from the virtual machine.

3. The computer-implemented method of claim 2, further comprising:
   causing the virtual machine to make the binary package available for subsequent retrieval.

4. The computer-implemented method of claim 3, further comprising:
   generating a user notification that the binary package is available for retrieval.

5. The computer-implemented method of claim 2, further comprising:
   causing the virtual machine to publish the binary package to a storage service.

6. The computer-implemented method of claim 1, wherein identifying a plurality of source files to be transferred comprises:
   obtaining a list of source files used to build the branch;
   determining, for a selected source file of the list of source files used to build the branch:
   (1) a destination virtual machine to which the selected source file is to be transferred;
   (2) whether the destination virtual machine is currently storing a source file that is in part identical to the selected source file; and
   a) if the destination virtual machine is currently storing a source file that overlaps substantially identical to the selected source file, identifying the selected source file as not to be transferred; and
   b) if the destination virtual machine is not currently storing a source file that overlaps substantially identical to the selected source file, identifying the selected source file as to be transferred.

7. The computer-implemented method of claim 1, wherein identifying a virtual machine for building at least a part of the branch comprises: determining whether a first virtual machine server has an idle virtual machine;
   if the first virtual machine server has an idle virtual machine, identifying the idle virtual machine as the virtual machine for building at least a part of the branch; and
   if the first virtual machine server does not have an idle virtual machine, instantiating a new virtual machine and identifying the new virtual machine as the virtual machine for building at least a part of the branch.

8. One or more hardware-implemented computer storage media having computer-executable instructions embodied thereon that, when executed, cause a computing device to perform a method of distributing a scalable build service, the method comprising:
   receiving, at a virtual machine, a source file for a branch, wherein the virtual machine is one of a plurality of virtual machines, the virtual machine configured with a build environment, wherein the plurality of virtual machines are instantiated on demand, based on requiring build environment resources of the plurality of virtual machines;
   generating a binary file based on processing the source file;
   generating a binary package from at least the binary file and a digital signature corresponding to the binary file, wherein the digital signature is generated at a signing server based on a representation of the binary file, the signing server being different from the virtual machine; and
   sending the binary package to a predetermined location.

9. The computer storage media of claim 8, wherein the build
   environment further comprises an agent that responds to a build service controller to facilitate activities in the build environment.

10. The computer storage media of claim 8, wherein the build service controller performs at least the following subfunctions of the function of identifying plurality of source files to be transferred for the branch:
  obtains a list of source files used to build the branch;
  determines, for a selected source file of the list of source files used to build the branch:
  (1) a destination virtual machine to which the selected source file is to be transferred;
  (2) whether the destination virtual machine is currently storing a source file that overlaps the selected source file; and
  a) if the destination virtual machine is currently storing a source file that overlaps the selected source file, identifies the selected source file as not to be transferred; and
  b) if the destination virtual machine is not currently storing a source file that overlaps the selected source file, identifies the selected source file as to be transferred.

11. The computer storage media of claim 8, wherein the build environment responds to direct user input in order to perform functions in the build environment.

12. The computer storage media of claim 8, wherein the virtual machine generates the entire binary file associated with a given branch.

13. The computer storage media of claim 8, wherein the binary file is allocated to the virtual machine for generation such that a load of generating the binary file is balanced among the virtual machines.

14. The computer storage media of claim 8, wherein a plurality of binary files corresponding to different branches is allocated to a single virtual machine.

15. A scalable and distributed build service system comprising:
  a plurality of virtual machines, a virtual machine in the plurality of virtual machines is adapted to perform the following functions:
  receiving, a source file for a branch, wherein the virtual machine is configured with a build environment, and wherein the plurality of virtual machines are instantiated on demand, based on requiring build environment resources of the plurality of virtual machines;
  generating a binary file based on processing the source file;
  generating a binary package from at least the binary file and a digital signature corresponding to the binary file, wherein the digital signature is generated at a signing server based on a representation of the binary file, the signing server being different from the virtual machine; and
  sending the binary package to a predetermined location;
  a build service controller adapted to perform the following functions:
  determining a branch to build;
  identifying a virtual machine for building at least a part of the branch;
  identifying a plurality of source files to be transferred for the branch, wherein the virtual machine processes at least the source file of the plurality of source files to generate a corresponding binary file;
  transferring the source file of the plurality of source files to the virtual machine;
  deploying the build environment on the virtual machine; and
  causing the virtual machine to process at least the source file of the plurality of source files so as to generate the binary file.

16. The system of claim 15, wherein identifying the virtual machine for building at least a part of the branch comprises:
  determining whether a first virtual machine server has an idle virtual machine;
  if the first virtual machine server has an idle virtual machine, identifying the idle virtual machine as the virtual machine for building at least a part of the branch; and
  if the first virtual machine server does not have an idle virtual machine, instantiating a new virtual machine and identifying the new virtual machine as the virtual machine for building at least a part of the branch.

17. The system of claim 16, wherein the build service controller is further adapted to perform the following functions:
  providing a frontend to receive user input;
  displaying a job status of generating the binary file; and
  providing access to build metrics for the plurality of virtual machines.

18. The system of claim 15, further comprising the signing server adapted to perform the following functions:
  receiving the representation of the binary file;
  generating the digital signature corresponding to the representation of the binary file; and
  communicating the digital signature.

19. The system of claim 16, wherein the build service controller is further adapted to perform the following functions:
  scheduling a build process for execution;
  deferring the build process when a load on the plurality of virtual machines is high; and
  scheduling the build process when an expected demand for the plurality of virtual machines is low.

20. The system of claim 16, wherein the build service controller is further adapted to perform the following functions:
  causing the digital signature for the binary file to be generated;
  transferring the digital signature to the virtual machine; and
  causing at least one of the plurality of virtual machines to generate a binary package from at least the binary file and the digital signature.

* * * * *